United States Patent [19]

Wise

[11] Patent Number: 4,553,078
[45] Date of Patent: Nov. 12, 1985

[54] SERVO CONTROL BOOSTER SYSTEM FOR MINIMIZING FOLLOWING ERROR

[75] Inventor: William L. Wise, Mountain View, Calif.

[73] Assignee: The United States of America as represented by the United States Department of Energy, Washington, D.C.

[21] Appl. No.: 61,114

[22] Filed: Jul. 26, 1979

[51] Int. Cl.⁴ .............................................. G05B 11/18
[52] U.S. Cl. .................................... 318/592; 318/594; 318/601; 318/619; 318/603
[58] Field of Search ............... 318/592, 594, 619, 601, 318/603

[56] References Cited

U.S. PATENT DOCUMENTS

| | | | |
|---|---|---|---|
| 3,458,785 | 7/1969 | Sordello | 318/594 |
| 3,710,222 | 1/1973 | Dummermuth | 318/594 |
| 3,798,430 | 3/1974 | Simon et al. | 318/573 |
| 3,835,360 | 9/1974 | Kiwiet | 318/594 |
| 3,953,774 | 4/1976 | Sato et al. | 318/594 |

OTHER PUBLICATIONS

Palmer, "Non Linear Feedforward Can Reduce Servo Settling Time", *Control Engineering*, Mar. 1978, pp. 53-55.

*Primary Examiner*—B. Dobeck
*Attorney, Agent, or Firm*—William H. F. Howard; Clifton E. Clouse, Jr.; Judson R. Hightower

[57] ABSTRACT

A closed-loop feedback-controlled servo system is disclosed which reduces command-to-response error to the system's position feedback resolution least increment, $\Delta S_R$, on a continuous real-time basis for all operating speeds. The servo system employs a second position feedback control loop on a by exception basis, when the command-to-response error $\geq \Delta S_R$, to produce precise position correction signals. When the command-to-response error is less than $\Delta S_R$, control automatically reverts to conventional control means as the second position feedback control loop is disconnected, becoming transparent to conventional servo control means. By operating the second unique position feedback control loop used herein at the appropriate clocking rate, command-to-response error may be reduced to the position feedback resolution least increment. The present system may be utilized in combination with a tachometer loop for increased stability.

6 Claims, 5 Drawing Figures

SERVO CONTROL BOOSTER SYSTEM FOR MINIMIZING FOLLOWING ERROR

The invention disclosed herein arose at Lawrence Livermore Laboratory in the course of, or under Contract No. W-7405-ENG-48 between the U.S. Department of Energy and the University of California.

BACKGROUND OF THE INVENTION

The invention relates to feedback loop control systems. More particularly, it relates to feedback loop control systems for machine tool slide drivers employing a position feedback control loop in combination with an optional tachometer feedback control loop.

In general, a servomechanism positioning system utilizes a closed-loop, automatic feedback control system in which the position of the load or the state of the controlled quantity is sensed or measured and then fed back for comparison between the actual position (or the actual state) and the desired position. This difference is used to regulate the output of the servomechanism. If the feedback signal and the reference input signal are not equal, a deviation or actuation signal is produced which, after suitable amplification, is impressed on the servo actuator, usually a servomotor. The servomotor, in turn, corrects the output variable so as to bring the feedback signal into coincidence with the reference input signal. System response, or the actual real-time position of a servoed device, is always different from command position in a highly variable manner. This is unavoidable since response is a complex function of the following system parameters: (1) command speed or position, per se, (2) the magnitude of incremental changes in command speed or position, (3) elapsed time from latest changes in command speed or position, (4) instantaneous bandwidth of the servoed device's governing control loop or correction constant, (5) instantaneous magnitude of time-dependent forward gain from the command input to the servo actuator, (6) command input update and hold times, (7) parameter tolerance errors, and (8) degradation of response agility from lost bandwidth as the command input approaches zero. The command-to-response error is greatly magnified when two or more servos operate together in real time, particularly when widely different command inputs are applied to the individual servo systems. Such a servo combination, nevertheless, is typically incorporated in machine tool slide drives employed in contour cutting operations. Thus, if servo-caused cutting errors are to be limited to magnitudes measured in microinches, or even sub-microinches, conventional closed loop servo correction and control design methods and hardware for minimizing command-to-response error, which is a function of the system parameters noted above, become increasingly inadequate.

Various approaches have been undertaken in attempting to reduce or stabilize this command-to-response error, or servo following error, while avoiding either reducing servo positioning speed or imposing prohibitive bandwidth operating limitations as discussed above. One approach is the subject of U.S. Pat. No. 3,798,430. The invention described therein involves controlling the velocity of a movable member along a given axis X by updating position commands by increments of $\Delta X$ during successive equal time periods $\Delta T$ so as to move the controlled member along the X-axis at a velocity $V_x = \Delta X/\Delta T$. The changing position command signal is periodically incremented by variable amounts during each of successive, equal time periods, $\Delta T$, in order to produce feed forward signals which are proportional to the individual axis velocities at which the controlled member is to be moved, so as to make its resultant velocity equal to that designated by numerical program information. This feed forward approach suffers from inherent performance limitations in that position corrections are determined with respect to the commanded position rather than the response position and/or velocity of the controlled member. Another approach is described by R. Palmer, Control Engineering, page 53, March 1978, which involves feeding the position error around the lead-lag compensation networks of the servo control loop and through a non-linear gain circuit. Although reductions in servo following error are realized by this technique, it fails to adequately address and compensate for the many factors which give rise to command-to-response errors. In addition, for large position errors, correction signals are limited in magnitude to a nearly constant voltage which was only 10-25% of full scale output. The present invention, however, overcomes all of the foregoing limitations by basing position correction errors on the response position of the controlled element, and by generating a greatly amplified position correction signal (to the full slew mode of operation) for even the smallest command-to-response position errors while immediately reverting to conventional control when the error signal is driven to zero.

It is an object of the present invention to reduce the response time of a servo positioning system by 2-3 orders of magnitude over that of a conventional servo system when input command signal levels, or changes therein, are very small.

Another object of the invention is to increase servo system instant positioning accuracy by operating the position feedback loop at a higher clocking frequency than the command update rate thus making accuracy independent of data sampling rates and associated system clocking frequencies.

Still another object of the invention is to reduce following error in a servo positioning system without increasing operating bandwidth by providing greatly amplified position correction signals for large position corrections while small input corrections are provided by more conventional feedback means.

Other objects and advantageous features of the invention will be apparent in a description of a specific embodiment thereof, given by way of example only, to enable one skilled in the art to readily practice the invention which is described hereinafter with reference to the accompanying drawing.

SUMMARY OF THE INVENTION

The present invention is a method and apparatus to reduce following error in a servo-controlled precision positioning system to the least increment of the servo's position-measuring resolution. A position feedback override capability is provided on a by-exception basis, i.e., when command-to-response error exceeds a predetermined threshold position least increment, which overrides the conventional control loop and provides more accurate and responsive position correction signals.

REVIEW OF FEEDBACK LOOP CONTROL THEORY AND TYPICAL PRIOR ART

A review of feedback loop control theory in relation to typical prior art is presented below for comparison with, and as background for, the present invention, to be described hereinafter in detail in a later section.

Figure 1:
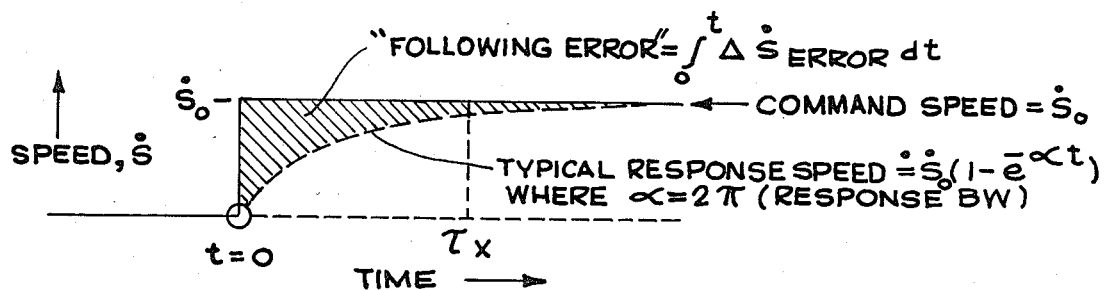
FIG. 1 is a curve illustrating the relationship between position following error, response speed and the time that a constant speed command has been in effect for a typical prior art servo control system.

Command-to-response error, or following error in a typical prior art servo control system, as a function of command speed, $\dot{S}$, as, for example, in positioning a machine tool, and the time period during which the speed command is in effect, $\tau_c$, is graphically shown in FIG. 1. The following error is represented by the area above the curve representing response speed, $\dot{S}_R$, and below the line representing the command speed for times greater than 0. Following error (FE) can be expressed by the following expression $$FE = \text{ERROR AREA} = \int_0^t \Delta \dot{S}_{ERROR}\, dt \qquad (1)$$

$$= \int_0^t \dot{S}\,[1 - (1 - e^{-\alpha t})]\, dt \qquad (2)$$

where
$\Delta \dot{S}_{ERROR}$ = errors introduced by changes in command speed
$\dot{S}$ = command speed
$\alpha = 2\pi \times$ Response Bandwidth (BW).

Integrating equation 2, the following expression for following error is arrived at $$FE = \dot{S}\left[\frac{1 - e^{-\alpha t}}{\alpha}\right] \qquad (3)$$

The servo's response distance, $S_R$, is equal to the command distance, $S_c$, minus the following error, or $$S_R = S_C - FE \qquad (4)$$

$$S_R = \dot{S}\tau t - \dot{S}\left[\frac{1}{\alpha} - \frac{e^{-\alpha t}}{\alpha}\right] \qquad (5)$$

during the application of a constant speed command.

Figure 2:
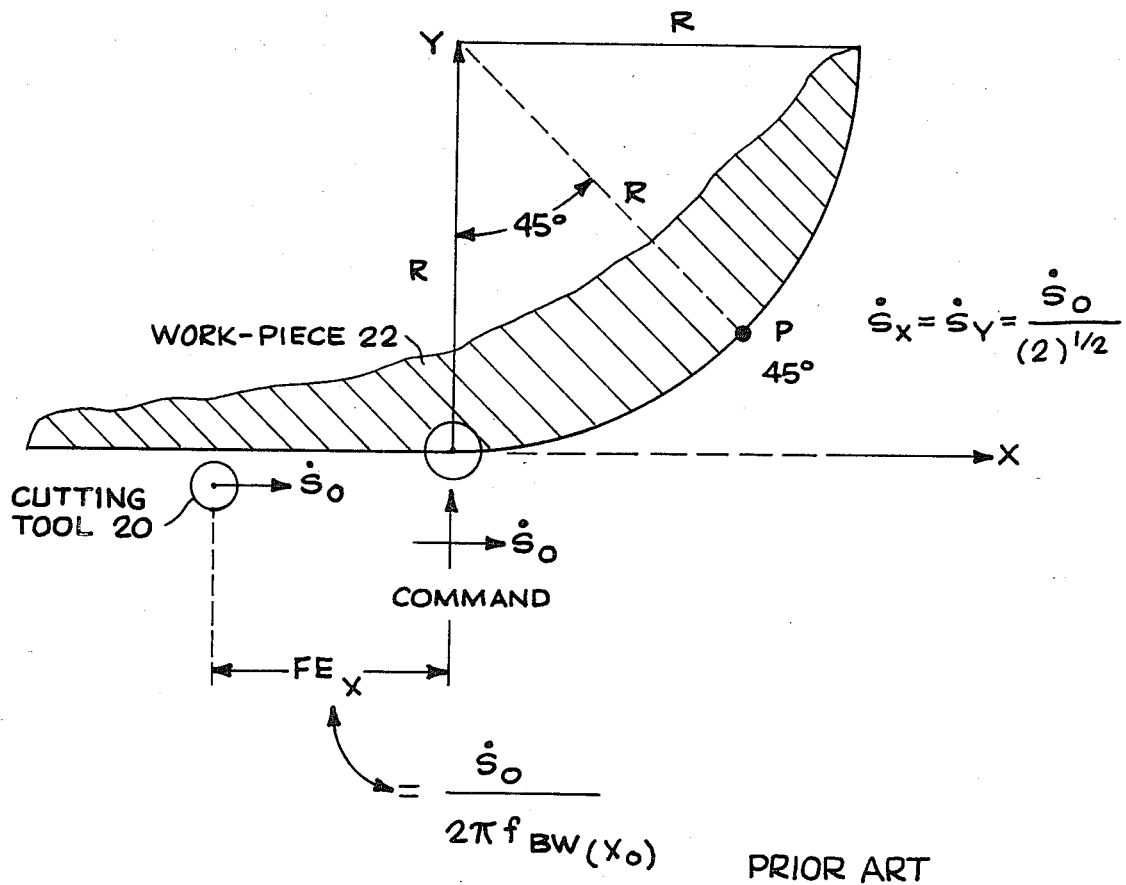
FIG. 2 is a representation of the action of a cutting tool under the control of a typical prior art two-servo control system in the contour machining of a work piece, and further includes expressions for various operating parameters.

One aspect of the performance of a servo system can be demonstrated in terms of FIG. 2 and the following analysis. FIG. 2 shows a cutting tool 20 operating on the surface of a work piece 22 in a surface contouring operation. The position response of the servo system, $S_R$, is given by Equation 5 which can be rewritten as $$S_R = \dot{S}\tau_c - \frac{\dot{S}(1 - e^{-2\pi f_{BW} \tau_c})}{2\pi f_{BW}} \qquad (6)$$

where
$S_R$ = actual displacement of the motor-driven device (i.e., cutting tool) or response distance $S$ = commanded linear of the cutting tool
  $= R\omega$ with
R = drive's equivalent radius or linear to rotary conversion
$\omega$ = drive's rotary speed
$\tau_C$ = time period during which speed command has been in effect
BW = closed-loop bandwidth of the speed-correcting amplifier/driver system, including the motor and tachometer.

The second term in Equation 6 represents the servo control system's following error displacement. The steady state following error, $\dot{S}\,(2\pi f_{BW})^{-1}$, represents a "fixed" error in response to a given speed command. The other component of the following error, $$\frac{\dot{S}\, e^{-2\pi f_{BW} \tau_c}}{2\pi f_{BW}}, \qquad (7)$$

represents the transient error introduced as a result of step-like changes in speed command. This factor vanishes in the steady state velocity situation.

Applying the servo's position response as defined by Equation 6 to a state-of-the-art, high performance precision machine tool where the contoured surface has a radius of 10 inches with the following performance criteria imposed:
Allowable cutting Error = 0.4 microinches,
$\dot{S}_{max}$ = 0.1302 inches/second (or 7.81 IPM), and
$f_{BW_x}$ = 30.0 Hz (closed loop bandwidth along one axis of movement),
results in a maximum following error in the x-direction, $FE_x$, at the point P in FIG. 2 given by the following:

$$FE_{xp} = \frac{\dot{S}_{max}}{2\pi f_{BW_x}} \qquad (8)$$

$$= \frac{0.1302 \text{ inches/second}}{2\pi\,(30.0 \text{ Hz})}$$

$$= 690.8 \text{ microinches}$$

To keep the system's cutting error down to $< \pm 0.4$ microinches would require a bandwidth in the y-direction, $f_{BW_y}$, of $30.0 \pm 0.025$ Hz at point P in FIG. 2 where $\dot{S}_x = \dot{S}_y$. This degree of positioning accuracy is the equivalent of a closed loop bandwidth error of $\pm 0.082\%$ which is approximately an order of magnitude more stable than currently available servo systems can consistently maintain. To provide the specified accuracy, i.e., $< \pm 0.4$ microinches, either the servo speed or the following error, or a combination thereof, must be reduced by at least an order of magnitude.

Figure 3:
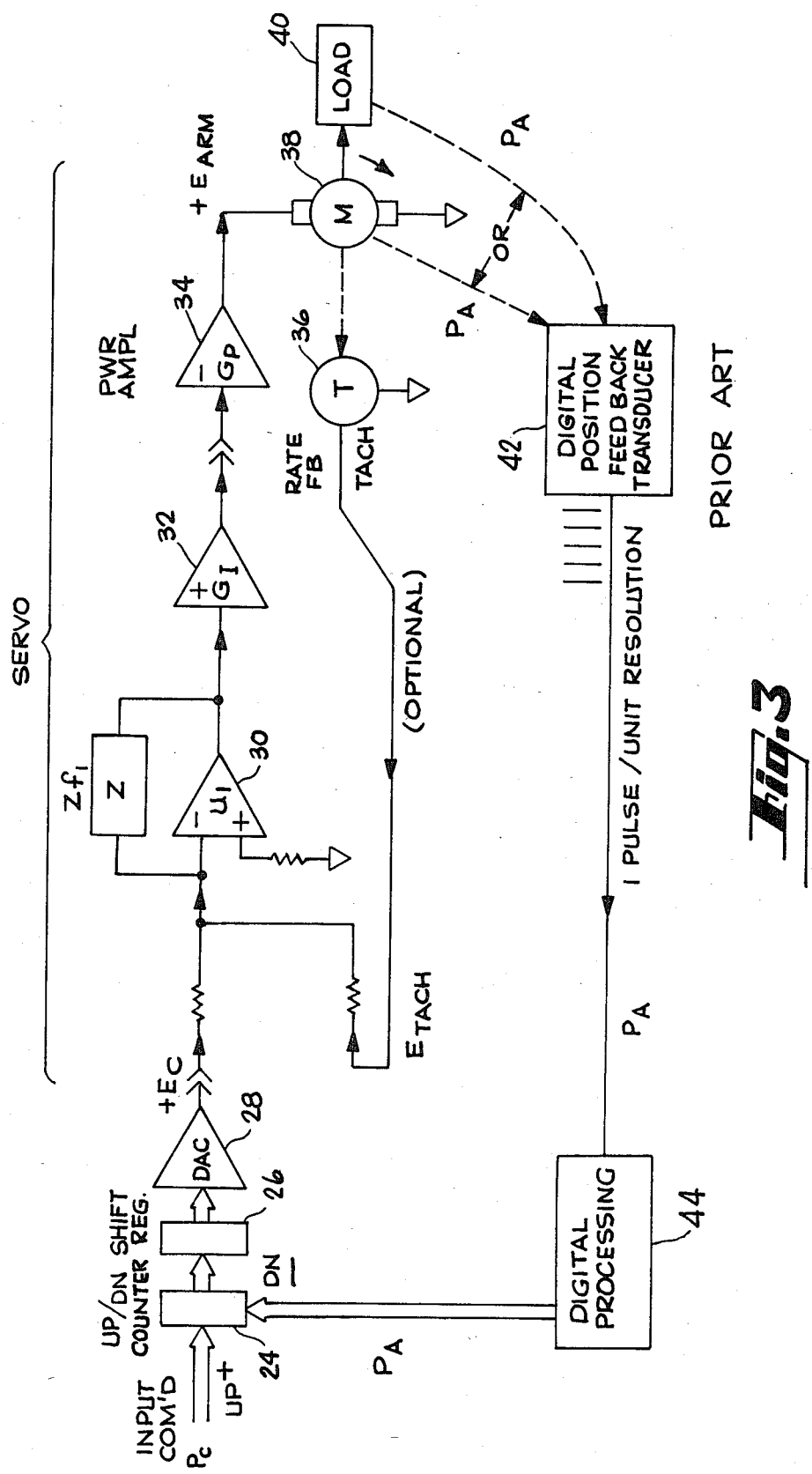
FIG. 3 is a generalized block diagram of a typical prior art servo control system employing a tachometer feedback control loop.

The general form of a position feedback control system to which has been added a tachometer feedback control loop is shown in FIG. 3. This system consists of a digitally-controlled, linear position closed loop in which servo damping is augmented by means of tachometer feedback stabilization. Amplifier gain is adjusted to the extent possible to meet design specifications. In this system the input position command, $P_c$, is compared with the actual position of an element 40 to be positioned. This comparison takes place in an up/down counter 24 where $P_c$ is compared with $P_A$, the actual position feedback signal. The up/down counter 24 in combination with a shift register 26 and a digital-to-analog converter (DAC) 28 convert the combined digital input signals, $P_c$ and $P_A$, into an analog command signal, $E_c$. If a tachometer feedback loop is utilized in the system, this command signal, $E_c$, is then combined with the tachometer feedback signal, $E_{TACH}$, with the resultant signal amplified in the servo signal amplification stage. This amplification stage typically consists of a differential amplifier 30, an intermediate amplifier 32 and a power amplifier 34. The tachometer 36, if employed in the system, provides speed control as well as servo stabilization by bucking, or smoothing, out $E_c$ at the differential amplifier's 30 input summing junction in a conventional manner. The amplified signal, $E_{ARM}$, drives the servo motor 38 which, in turn, drives the load 40 in positioning a given element. The rate feedback loop comprised essentially of the tachometer 36 receives velocity information from the servo motor 38 while the position feedback loop receives actual position information from either the servo motor 38 or the load 40, i.e., the element being driven. The position feedback loop typically includes a digital position feedback transducer 42 which converts the analog position feedback signal to digital format with typically 1 pulse/unit resolution. The digitized position feedback signal, $P_A$, is then passed through a digital signal processor 44 which makes $P_A$'s format compatible with that of the input command, $P_c$. The performance of prior art servo-controlled precision positioning systems has suffered not only from errors in the command input signals, but also from errors in the command correction signal generated by the feedback control loop itself. The present invention, however, by employing high data sampling rates in generating greatly amplified correction signals whenever a predetermined position error threshold is exceeded, essentially eliminates errors generated by the feedback control loop.

DESCRIPTION OF THE PREFERRED EMBODIMENT

Reference will now be made in detail to a present preferred embodiment of the invention, an example of which is illustrated in the accompanying drawing. While the invention will be described in connection with a preferred embodiment, it will be understood that it is not intended to limit the invention to that embodiment. On the contrary, it is intended to cover all alternatives, modifications, and equivalents as may be included within the spirit and scope of the invention as defined in the appended claims.

Figure 4:
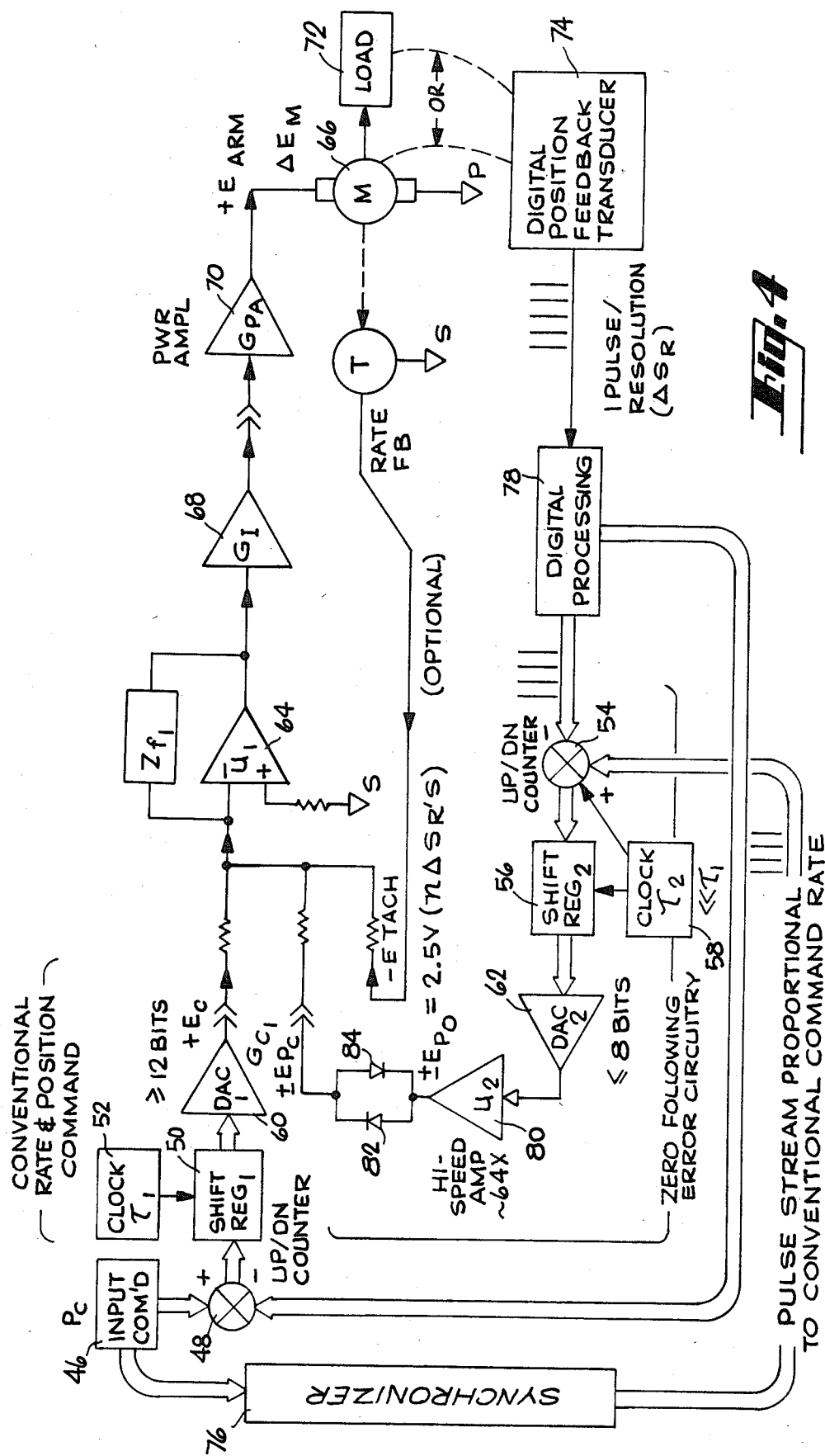
FIG. 4 is a block diagram in general form of a servo control feedback system according to the invention.

Referring now to FIG. 4, a general block diagram of a machine tool servo control system illustrating applicant's invention is shown therein. The system utilizes a position updating scheme on a real-time, increment-by-increment basis. The position correction signal, $E_{po}$, is operational only when there is a command-to-response error present. With a command-to-response error, $\Delta S_R$, present, where $\Delta S_R$ is equal to the least significant unit of position measurement, $+E_{PO}$, the position correction feedback signal, becomes approximately 2.5 Volts, or 2.5(n) Volts where n is the number of $\Delta S_R$ units in the command-to-response error. $E_{pc}$, the corrected position feedback signal, equals 0 for n=0 or [2.5(n)−0.5]Volts for n>0, with the 0.5 Volt arising from the diode cutoff circuit in the position feedback loop. This large signal, $E_{pc}$, when not zero, essentially drives the servo motor towards its power limiting state. The controller's command is boosted by the following error position feedback control loop the equivalent of 120% of the slew speed whenever position error, i.e., following error, is >5 times $\Delta S_R$. The servo motor capability therefore exceeds the slew speed by 220% or is current-limited for this and other reasons. For all controller speed commands including slew, the servo following error circuit maintains servo position within $\pm \Delta S_R$ 2 of the commanded position throughout the entire contouring speed range. The effective bandwidth of the representative system is >1.9 KHz (in a 30 Hz nominal system) with the correction output exceeding the controller least significant bit command by three orders of magnitude. For small position correction commands the position feedback control loop is removed from the circuit by means of diode disconnects, and position control is again provided by the conventional position control loop.

More specifically, position control data for a given axis of motion is generated by a machine control unit 46 which develops and routes position data to the appropriate axis control loop. The machine control unit 46 receives its input from any one of a variety of data sources such as punched paper tape or keyboard entry. The digital input pulse rate varies from 0 to $1.5 \times 10^6$ pulses/second (pps). The input commands generated by the machine control unit 46 are transmitted to a first up/down counter 48 for response comparison and the difference goes to a first shift register 50, which is operated by a first clocking block 52 at a rate of $\tau_1$ for conventional operation. The input "pulse stream" from the synchronizer unit 76 is also transmitted to a second up-down counter 54 for response comparison and the difference goes to a second shift register 56 which is operated by a second clocking block 58 at a rate $\tau_2$, which is orders of magnitude less than $\tau_I$. It is this signal which is applied on a "by exception" basis to provide an essentially zero following error command input. These digital command signals, the conventional input command and the zero following error comand input, are converted to analog format by digital-to-analog converters, 60 and 62, respectively. The signal in the rate loop, $E_{TACH}$, if used, provides smooth speed control by balancing against input commands in the input circuits of the differential amplifier ($U_I$) 64 in a conventional manner. The differential amplifier's net output signal is transmitted to the servo motor 66 via an intermediate amplifier ($G_I$) 68 and a power amplifier ($G_{PA}$) 70, in addition to the differential amplifer 64 such that $$(G_{UI})(G_I)(G_{PA}) > 10^5. \tag{9}$$

The amplified signal is then transmitted to the servo motor 66, which in turn acts on the system's load 72. From the servo motor 66, velocity, or rate, information is fed back in analog form via the tachometer feedback loop. In addition, position information is fed back via the position feedback loop from either the servo motor 66 or the load 72. In the position loop, the analog signals are first converted to digital form via a digital position feedback transducer 74 such that there is generated one pulse per unit of position resolution. The position feedback transducer 74 may be an encoder, a resolver, a laser, or even a position potentiometer may be utilized in the embodiment described herein. Following analog-to-digital conversion by the digitizer 74, the position feedback signals are made compatible with the input commands from the "pulse stream" from command speed synchronizer 76, which provides *precisely* proportional pulses-persecond, PPS, to the conventional Rate Command, and the second clocking block, so that the input command pulses and position feedback pulses may be compared at a $\tau_2$ clock rate and the resultant signal converted to an analog format as previously described. This function could be performed by any of a large number of readily available signal processors 78. The analog signal in the embodiment described herein is then amplified by a factor of 64 by the high speed amplifier, $G_{PO}$, 80. The amplified signal is then passed through the diode cutoff network made up of two diodes, 82 and 84. The diodes block all output from the high speed amplifier 80 which is less than approximately 500 millivolts. The high speed amplifier 80 provides 2.5 Volts for each error bit into the second digital-to-analog converter 62 such that $$E_{PC} = 2.5(n) \text{ Volts} - 0.5 \text{ Volts} \tag{10}$$

where n is the number of digital pulses each of which is equal to one unit of position resolution, $\Delta S_R$. This permits the zero following error position correction feedback loop to effectively disconnect from a control function when the output of DAC 2 62 goes to zero and to assume command when the output of DAC 2 equals one or more error bits.

As previously described, two clocking systems are utilized in this servo control system. One clocking system operates at a rate $\tau_l$ and is employed in the digital-to-analog conversion of the conventional input command. The other clocking network operates at a rate $\tau_2$ and is used in comparing the input command pulse stream with the response position feedback pulses and the digital-to-analog conversion of the resultant difference. Since the disclosed second closed-loop system described herein provides control signals to the servo which are orders-of-magnitude greater than the disclosed conventional command input, when at Least-Significant-Bit Command levels, it must be high-speed clocked. It is well known in communications theory that the clocking frequency must be at twice the effective bandwidth of signals presented to the clocked circuit. Still another constraint in a control system is that the following error signal clock period, $\tau_2$, be a submultiple of the servo motor's response, $\tau_3$, in providing changes in position feedback, i.e., $\tau_2 < < \tau_3$.

Ideally, the zero following error signal clock period, $\tau_2$, should be equal to or less than approximately 6% of one position resolution unit equivalent of the servo motor's response, $\tau_3$. In the present system, with the command input clocking system operating at a rate, $\tau_l$, of 10.24 msec, the high speed clock, $\tau_2$, is operated at 60 $\mu$sec. The servo motor requires approximately 900 $\mu$sec. to initiate a command-to-response error correction when operating in the current limiting mode, such that $\tau_2/\tau_3 \rightarrow 6.67\%$.

Figure 5:
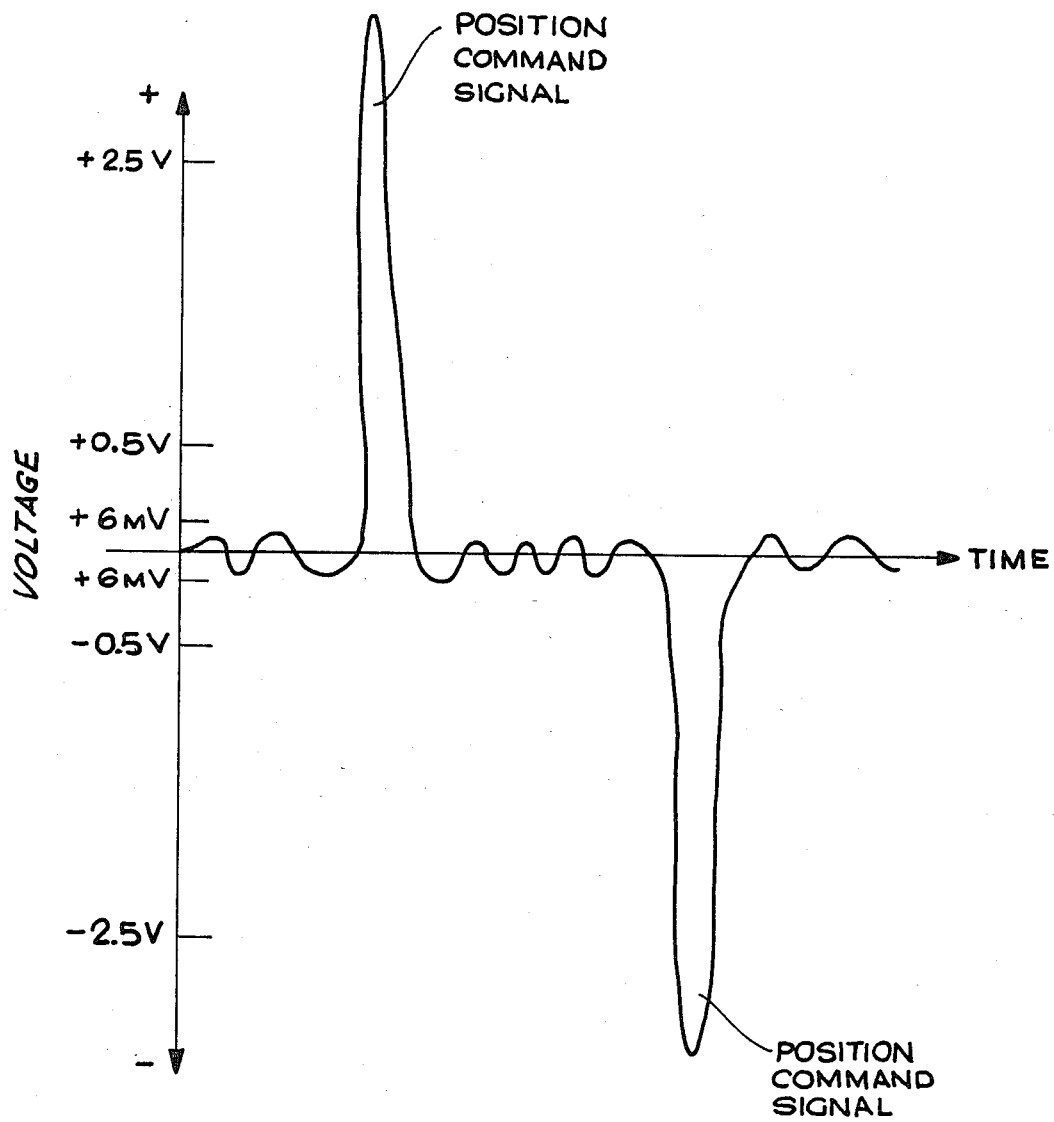
FIG. 5 is a plot of voltage with time showing a typical operation of the diode cutoff network used in the invention.

The primary purpose of the diode cutoff is to compensate for inherent op amp drift and uncertainty at zero input, while simultaneously providing for a sharp voltage cutoff in disabling the position feedback signal in the position feedback loop. High speed op amp signal drift is typically $\sim \pm 6$ m volts. Referring to FIG. 5, the voltage per bit in the position feedback loop is given by the following expression:

$$E_{po/bit} = \frac{10 \text{ V}}{\text{DAC capacity}} \tag{11}$$

$$= \frac{10 \text{ V}}{2^8} \times 64$$

$$= 2.5 \text{ V}/bit$$

In the preferred embodiment of the present invention, the diode cutoff is typically 0.5 volt, which sufficiently exceeds op amp signal drift and uncertainty to preclude false alarms, while being less than the voltage per bit of the position correction signal to permit injection of the position feedback signal into the rate loop when necessary. The relationship of these signal levels and their respective values are shown in FIG. 5.

Thus it is apparent that there has been provided, in accordance with the invention, a position-tachometer feedback loop servo control system which minimizes servo response-to-command error for essentially all operating times during which unconditional stability is maintained. By operating the position feedback loop at a much higher clocking rate than that at which the input commands are received and by applying these greatly amplified position correction signals on a by-exception basis when a given error level is exceeded, system following error is reduced to the position feedback resolution least increment, $\Delta S_R$, for all operational times of consequence and for all operating speeds.

A best mode of the present invention is represented by Lawrence Livermore Laboratory's Diamond Turning Machine Three (DTM-3). This system corresponds essentially to the system described in FIG. 4. The Input Command Module 46 consists of an Allen-Bradley 7320 controller, providing a series of input pulses which are passed to synchronizer 76. The synchronizer 76 is a state-of-the-art digital arithmetic board for transforming the input pulse register into a pulse stream which is precisely proportional to the servo command velocity, in response to the $P_c$ Register Command. Arithmetic units of this type are well known in the art. The synchronizer used in the DTM-3 system is essentially identical to a synchronizer used in computer model No. II-25 manufactured by Modular Computer Systems, Inc. ("ModComp"). The digital feedback transducer 74 consists of a Hewlett-Packard laser subsystem, Model No. HP 5501A. The processing unit 78 is an integral part of the Allen-Bradley 7320. The Diamond Turning Machine Three (DTM-3) at Lawrence Livermore Laboratory, with the above components, is capable of reducing position time response by four orders of magnitude (from 16 seconds to 1–2 milliseconds) for a least increment of position Command Input, compared to a system as shown in FIG. 3. In addition, servo-ed speed response to command, or agility/responsiveness, was improved by three orders of magnitude (from approximately 2 seconds to 1–2 milliseconds). Thus the present invention fully satisfies the objects, aims, and advantages set forth above.

What is claimed is:

1. A closed-loop feedback control system for precisely controlling the instantaneous position of a machine element along an axis for all operational speeds, in accordance with numerical input commands, said system comprising:
   a source of numerical input command signals;
   first circuit means for producing feedback signals representing the position of said machine element;
   first comparing means for comparing the numerical input command signals from said source with the position feedback signals from said first circuit means;
   means responsive to said first comparing means for generating first position correction signals being proportional to the difference between said numerical input command signals and said position feedback signals;
   means responsive to the said means for generating first position correction signals to generate an amplified signal output for producing motion of said machine element;
   synchronizer means responsive to the numerical input command signals from said source for providing a pulse stream command signal having a pulse rate directly proportional to the input command signal;
   second comparing means for continually comparing said position feedback signals with said pulse stream command signal and producing a difference signal representing the difference therebetween;
   gating means responsive to said difference signal and second comparing means for producing a command correction signal when a predetermined position correction limit is exceeded;
   means for combining the numerical input command signals with the command correction signals to produce a composite numerical input command signal representing second position correction signals; and
   amplifier and motor means responsive to said composite numerical input command signal for driving said machine element along said axis when said predetermined position correction limit is exceeded.

2. A closed-loop feedback control system according to claim 1, which includes:
   second circuit means for producing second command signals representing the command velocity for said machine element; and
   means for combining said position feedback signals additively with said second command signal to produce said second position correction signals when the predetermined position correction limit is exceeded, with the command signal being said first position correction signals when said predetermined position correction limit is not exceeded.

3. The apparatus of claim 1, wherein the second comparing means is responsive to said first position correction signals for continually comparing the position feedback signals with a predetermined position correction limit, and the gating means is responsive to said second comparing means for combining the first position correction signals with the numerical input commands via a diode cutoff network which permits the first position correction signals to combine with the numerical input command signals in producing the composite numerical input command signals when a predetermined position correction signal voltage threshold corresponding to a predetermined difference between the actual and desired positions of the machine element is exceeded, with the input command signals to said motor means being determined solely by said numerical input commands and said feedback signals when said predetermined position correction signal voltage threshold is not exceeded.

4. A closed loop feedback control system for precisely controlling the instantaneous position of a machine element along an axis for all operational speeds in accordance with digital input commands, the apparatus comprising:
   a source of digital input commands;
   means for converting said digital input commands to analog form, said means having an amplified analog signal output for producing motion of said machine element, and operating at a first clocking rate, $\tau_1$;
   first circuit means for producing digital feedback signals representing the actual position of said machine element;
   first comparing means for comparing the digital input commands with the digital position feedback signals;
   means for generating amplified analog position correction signals, the magnitude of said position correction signals being proportional to the difference between said digital input commands and said digital position feedback signals, said digital-to-analog conversion means operating at a second clocking rate, $\tau_2$, such that $\tau_2 << \tau_1$, thus permitting the position correction signals to be updated/revised at a much faster rate than the rate at which said input commands are updated/revised, and where $\tau_2$ is a required sub-multiple of the closed loop feedback control system's response period;
   second comparing means responsive to said position correction signals for continually comparing said position feedback signals with a predetermined position correction limit;
   gating means responsive to said second comparing means for producing a command correction signal when said predetermined position correction limit is exceeded;
   means for combining the digital-to-analog converted input commands with the command correction signals to produce a composite input command signal; and
   amplifier and motor means responsive to said composite input command signal for driving said machine element along the axis.

5. A method of moving a machine element along an axis to keep its position dynamically in agreement with changing numerical input command signals, said method causing an actuator control circuit to command an actuator to move the machine element through positioning motions in response to said numerical input command signals, said machine element being connected to a measuring circuit for producing position feedback signals representing the actual position of the machine element, the method comprising the steps of:
   comparing said numerical input command signals with said position feedback signals; and
   changing the numerical input command signals as a function of the difference between said numerical input command signals and said position feedback signals, when a predetermined difference signal level is exceeded corresponding to a predetermined difference between the numerical input command signals and the position feedback signals is exceeded, with the actuator control commands being determined solely by said numerical input command signals and said position feedback signals when said predetermined difference signal level is not exceeded.

6. The method of claim 5, wherein the step of changing the numerical input commands further comprises the steps of:

generating velocity command signals representing the commanded velocity of said machine element;

generating command correction signals for combining with said numerical input command signals in producing a composite numerical input command signal, said command correction signals being produced by combining said position feedback signals with said velocity command signals when the position feedback signal level exceeds a given threshold corresponding to a predetermined difference between the actual position and the commanded position of said machine element; and said actuator control circuit to command said actuator to move the machine element through positioning motions in response to said modified numerical input commands.

* * * * *